Feb. 16, 1932. F. CARLIN 1,845,996
BRAKE ACTUATING MECHANISM
Filed June 23, 1930  3 Sheets-Sheet 1

Inventor
FRANK CARLIN
By his Attorney
George F. Des Marais

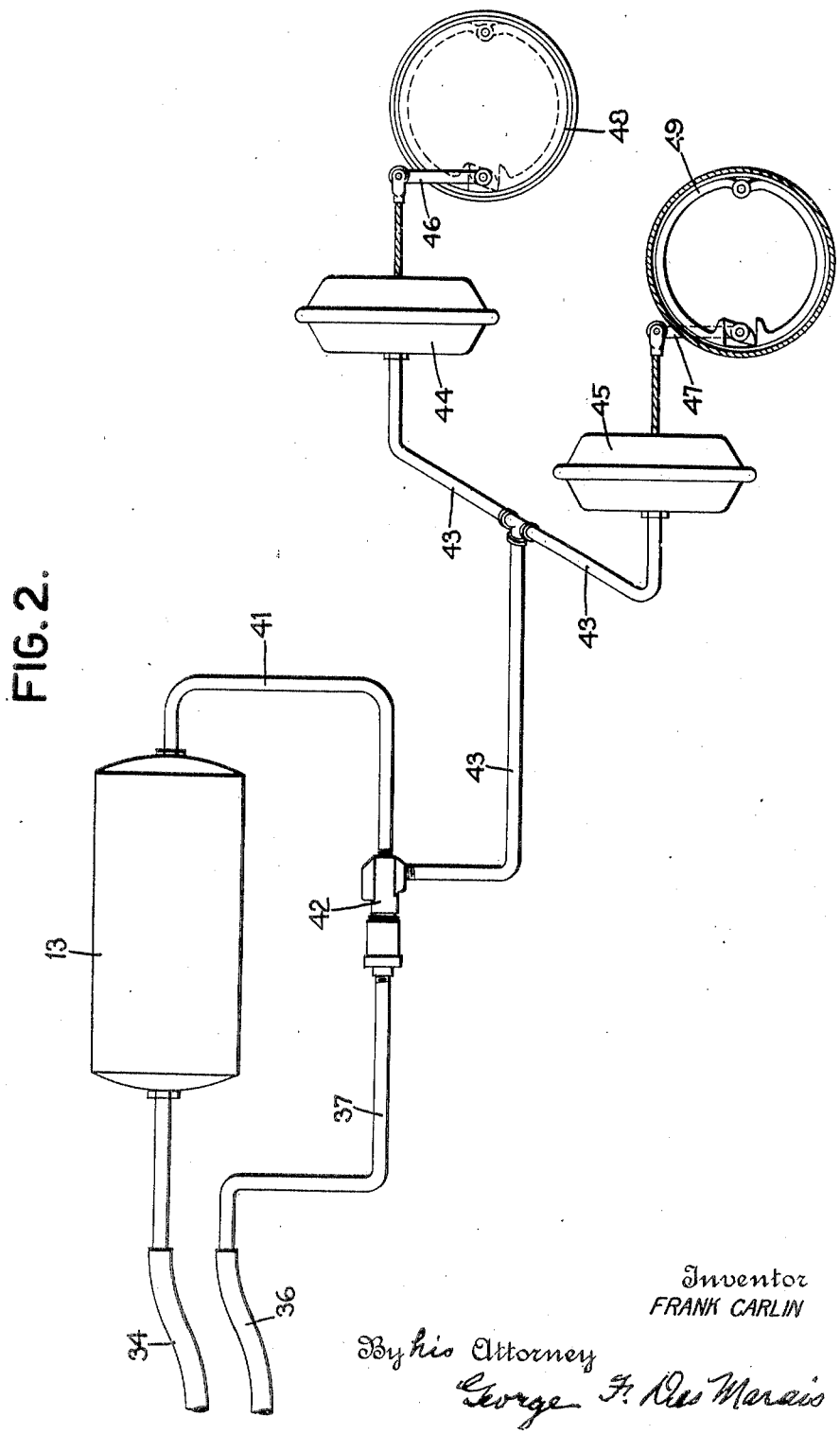

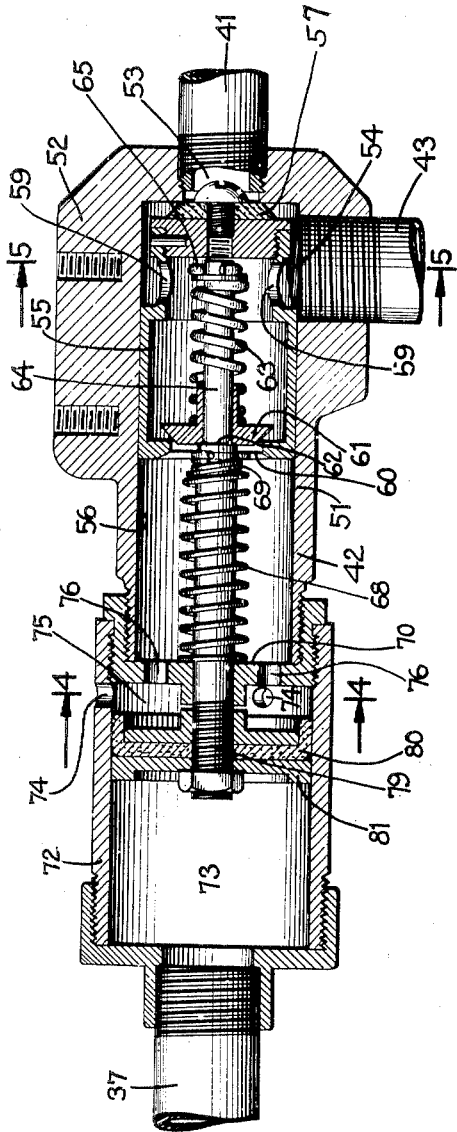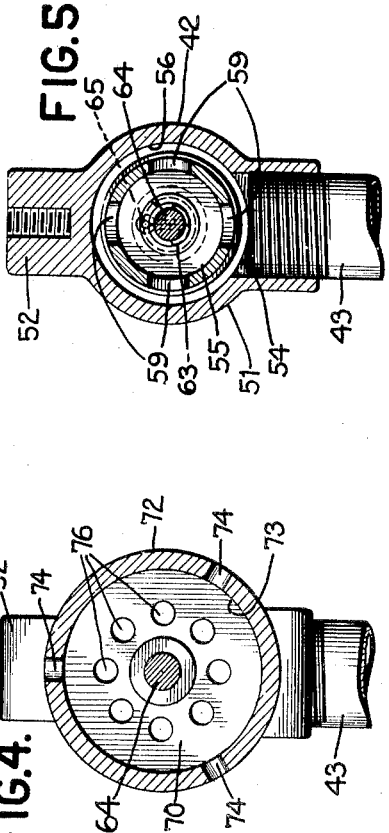

Patented Feb. 16, 1932

1,845,996

UNITED STATES PATENT OFFICE

FRANK CARLIN, OF LOS ANGELES, CALIFORNIA, ASSIGNOR, BY MESNE ASSIGNMENTS, TO THE STARR PIANO COMPANY, OF RICHMOND, INDIANA, A CORPORATION OF INDIANA

BRAKE ACTUATING MECHANISM

Application filed June 23, 1930. Serial No. 463,005.

This invention relates to brake actuating mechanisms. More particularly the invention relates to a brake actuating system utilizing differential pressure for controlling the operation of brakes on a motor vehicle and on a vehicle which is being towed.

Among the objects of this invention is to provide a braking system which is under the control of an operator driving a towing motor vehicle or tractor and which is designed for effecting actuation of brakes on one or more trailers without undesirable lag in the application and control of the brakes on the trailers in respect to the brakes on the tractor.

Another object of the invention is to provide in an automotive brake system for operating the brakes of a trailer from a source of suction, a novel control valve for use on the trailer for controlling the operation of the trailer brakes.

Another object of the invention is to provide a simple and economical system for operating a plurality of sets of brakes under the control of a source of vacuum and in which each set of brakes is controlled by a separate control valve interconnected with the other.

Other objects and advantages of the invention will appear from a detail description of the same which consists of the features of construction and combination of parts hereinafter described and claimed.

In the drawings:

Fig. 2 illustrates the brake actuating mechanism of the system which is located on the trailer.

Fig. 3 is an enlarged detail of a longitudinal section of the vacuum control valve which controls the operation of the brakes on the trailer.

Fig. 4 is a section on the line 4—4 of Fig. 3.

Fig. 5 is a section on the line 5—5 of Fig. 3.

Figure 1:
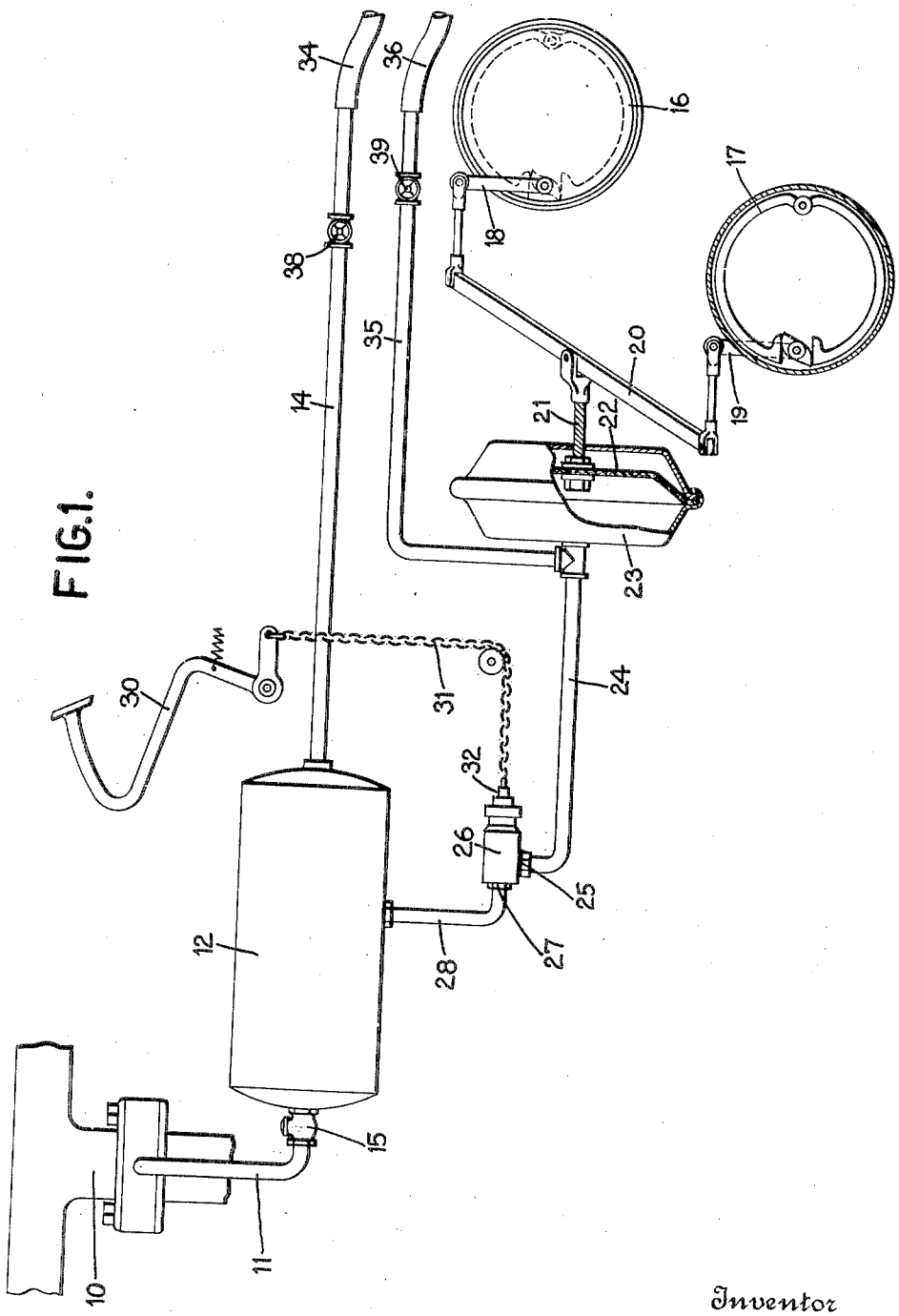
Fig. 1 illustrates the brake actuating mechanism of the system which is located on the tractor.

In Fig. 1, which illustrates the brake actuating mechanism for the tractor, I have shown only the mechanical parts which have to do with the vacuum operated braking system of the present invention. I have illustrated the source of suction as the manifold 10 of the engine of the tractor. Conduit 11 which is connected with the manifold 10 is always subjected to the suction within the manifold. Whenever the engine of the tractor is running, the tank 12 on the tractor and the tank 13, Fig. 2, on the trailer, and connecting conduit 14 is subjected to the evacuating action of the intake manifold. A ball check valve 15 of any well known construction is placed in conduit 11 for the purpose of permitting the flow of air from the tanks 12 and 13 to the manifold 10 but precluding the flow of air in the reverse direction.

Two of the brakes 16, 17 of the tractor are illustrated and these are connected by brake levers 18, 19 respectively, to an equalizer 20. Member 21 connects the equalizer with the diaphragm 22 of a pneumatic motor 23 which is fixed to the frame of the vehicle. The low pressure side of the pneumatic motor 23 is connected by means of a conduit 24 with one port 25 of a three-way valve 26. Another port 27 of the three-way valve is connected to the tank 12 by means of conduit 28. Any type of three-way valve may be used in which it is possible to connect conduit 24 with conduit 28 or with the atmosphere, at will. Such a valve will be described hereinafter. For a detailed description of a three-way valve suitable for use in the present system reference may be had to United States Patent No. 1,804,570. The operation of the three-way valve is under the control of the brake pedal 30, which, when depressed from normal position, causes flexible member 31 to pull upon the rod 32 of the valve core of the three-way valve 26. The initial movement of flexible member 31 causes the discontinuance of any communication of conduit 24 with the atmosphere and a further movement causes conduits 24 and 28 to be placed in communication with each other. When this last condition prevails the suction side of the pneumatic motor 23 is subjected to the sub-atmospheric pressure condition prevailing in tank 12 with the result that diaphragm 22 of the pneumatic motor is caused to move to the left, Fig. 1, and apply the brakes of the tractor. When the motor is again permitted to be subjected to atmospheric pressure, diaphragm 22 will return to normal position under the influence of springs (not shown).

The effect of the sub-atmospheric pressure within the tank 12 is carried to the trailer through conduit 14 and flexible connection 34 which is connected with tank 13. The condition prevailing within conduit 24 is also made useful on the trailer by means of a conduit 35 and a flexible conduit 36 which connects conduit 35 with conduit 37 on the trailer. It is apparent that the brake system of the tractor just described is complete in itself so far as its utility is concerned and that whenever no trailer is connected to the tractor the pneumatic brake system of the tractor may be used by closing valves 38, 39 in conduits 14, 35 respectively.

As has been stated hereinabove, tank 13 is always subjected to sub-atmospheric pressure conditions prevailing in tank 12. Conduit 41 runs from tank 13 and is connected with one port of a three-way valve 42. Another port is connected by means of conduit 43 by one or more pneumatic motor means 44, 45. The diaphragms of the motors are connected respectively to brake levers 46, 47 of brakes 48, 49 of the trailer. It will be understood that the construction of these pneumatic motors may be similar to that of the pneumatic motor used on the tractor and that their size is dependent upon the force desired to be applied to the brakes.

The three-way valve 42 is pneumatically controlled by the pressure existing in conduit 37 and, hence, is under the direct control of the driver of the tractor since conduit 37 is directly connected to port 25 of the three-way valve 26 by means of conduits 24, 35, 36 and 37.

In Fig. 3 I have illustrated a longitudinal section of an enlarged detail of the three-way valve 42 illustrated in Fig. 2. The main body of this valve is a cylinder 51 which has a lug 52 by which it may be supported from the chassis of the trailer. Port 53 and port 54 are provided in the cylinder, port 53 having connection with conduit 41 and port 54 having connection with conduit 43. These two ports are normally maintained out of communication with each other, as may be seen in Fig. 3, by a core or valve member 55 which is longitudinally movable within the bore 56 of the cylinder. This core member is hollow and its end 57 serves as a displaceable closure of port 53. The interior of the core member 55 communicates with the bore of the cylinder 51 by means of a plurality of holes 59. The other end 60 of the core member forms a valve seat for valve 61 which is normally unseated. Valve 61 normally abuts a shoulder 62 and is held thereby from seated engagement with valve seat 60 when the valve is in normal position. Valve 61 is normally urged against shoulder 62 by means of a spring 63, one end of which abuts valve 61 and the other end of which is staked to rod 64 by means of a cotter pin 65. As will subsequently appear, when rod 64 is moved to the left, Fig. 3, valve 61 seats upon valve seat 60 and is maintained thereagainst by the action of spring 63 although rod 64 may move relatively to valve 61. When rod 64 is moved relatively to the cylinder 51, the core member 55 is moved therewith, through the intermediary of spring 63, valve 61 and cotter pin 65.

A spring 68 has one end 69 staked to rod 64 and its other end abuts wall 70. Wall 70 is removably secured to the cylinder 51. Spring 68 normally maintains rod 64 and core member 55 in their farthest right hand positions relative to the cylinder 51.

A sleeve member 72 includes a chamber which is in open communication with conduit 37. This sleeve member 72 is secured to the wall piece 70 of cylinder 51 and has its other end closed except for a port. A plurality of perforations 74 always subjects the right end 75 of chamber 73 to atmospheric pressure. Atmospheric pressure is communicated through perforations 76 in wall 70 to bore 56 of cylinder 51 and past valve 61 when this latter member is unseated.

The normal condition of the valve is illustrated in Fig. 3 and in this condition the atmosphere has access to conduit 43 connected to port 54. When the valve rod 64 is moved to the left the communication of conduit 43 with the atmosphere is cut off with the seating of valve 61 and, upon further leftward movement of valve rod 64, the end 57 of the core member is unseated from port 53 and communication between conduits 41 and 43 is permitted. This communication causes the air in pneumatic motors 44 and 45 and in connecting conduits 43 to be evacuated through conduit 41 and into tank 13 which is constantly being subjected to the suction at the manifold 10 of the engine on the tractor. Under these conditions pneumatic motors 44, 45 are energized and their power is applied to the brakes of the trailer.

In addition to keeping valve 61 seated, spring 63 enables the core member and valve 57 to move relatively to the rod 64 under the influence of the suction at port 53 so as to permit, under certain conditions of operation, the automatic adjustment of the degree of opening of port 53.

A reversal of the movement of the core member 55 restores normal non-communicative condition of conduits 41, 43 and subsequently permits the atmosphere to enter conduit 43 by means of the holes 74, 76, valve 61, and holes 59. Under this condition the brakes are released.

So much of the three-way valve just described is suitable for use as the three-way valve 26 shown in Fig. 1. As applied to the trailer in the system of the present invention means are provided for operating the valve rod 64 pneumatically. The end 79 of rod 64 carries a cup-shaped leather washer 80, which, together with a disk 81, forms a piston. This piston and disk fills the bore of the chamber 73.

It is apparent that when the three-way valve 26 on the tractor is operated for the purpose of applying the brakes, the suction to which conduit 24 is subjected becomes effective in chamber 73 through conduits 35, 36 and 37. Accordingly, the suction operated valve 42 is made automatically responsive to the action of the manually controlled three-way valve 26. The result of this is that the brakes on the trailer are applied without any appreciable lag between their braking efforts and the braking efforts of the brakes on the tractor. The releasing action of the brakes on the two vehicles is equally without appreciable lag since the pneumatically operated valve 42, with its atmospheric ports, is upon the trailer in the vicinity of the pneumatic motor means which are to be subjected to atmospheric pressure conditions for permitting the release of brakes of the trailer.

Tank 12 on the tractor provides a large volume which is maintained at sub-atmospheric pressures at all times. The pressure of this tank renders the braking facilities on the tractor particularly sensitive because it is always subjected to sub-atmospheric pressure and affords a large capacity for immediately receiving air evacuated from conduits and the pneumatic motor means of the tractor.

Tank 13 performs the same function for the pneumatic motor means on the trailer as tank 12 does for the pneumatic motor means of the tractor. Its presence on the trailer is desirable for, thereby, it is possible to minimize the length of the conduits 41 and 43 which have connections with the pneumatic motors.

My automotive brake system for a trailer under the control of the controlling valve for the brakes of the tractor is economical and efficient in that but a minimum length of conduit is necessary and it enables a sensitive control of the trailer brakes by the controlling means for the tractor brakes. It may be readily installed and the system is susceptible to adjustment to suit different braking conditions desired on different trailers and in different installations.

The invention is capable of wide variation and relationship of parts without departure from the nature and principle thereof. I do not restrict myself unnecessarily in the foregoing or other particulars, but contemplate such alterations and modifications within the scope of the appended claim as may be found advisable.

What I claim is:
In a brake actuating system, a pneumatically controlled three-way valve comprising, in combination, a cylinder having two ports, a hollow valve element normally maintaining said ports from communication, said hollow valve element having holes therein permitting communication of one of said ports with the atmosphere, resilient means normally maintaining the hollow valve element in normal position, a valve rod for operating said hollow valve element, means carried by said valve rod for closing communication of the atmosphere with the interior of the hollow element, a wall closing one end of said cylinder through which said valve rod passes, said wall being in the form of a cap and having holes, a second cylinder secured to said wall and having holes therein near one end, and a piston secured to said valve rod and movable in said last-named cylinder, said cylinder forming an enclosed chamber which may be evacuated through a port in its wall.

In testimony whereof I hereto affix my signature.

FRANK CARLIN.